(12) United States Patent
Pamplin

(10) Patent No.: US 12,336,667 B1
(45) Date of Patent: Jun. 24, 2025

(54) BLENDER WITH ADDRESSABLE BLADES

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( * ) Notice: Subject to any disclaimer, the term of this patent is extended or adjusted under 35 U.S.C. 154(b) by 648 days.

(21) Appl. No.: 17/673,622

(22) Filed: Feb. 16, 2022

(51) Int. Cl.
*A47J 43/046* (2006.01)
*A47J 43/07* (2006.01)

(52) U.S. Cl.
CPC ......... *A47J 43/0722* (2013.01); *A47J 43/046* (2013.01)

(58) Field of Classification Search
CPC ............................ A47J 43/0722; A47J 43/046
USPC ....................... 366/326.1; 416/147
See application file for complete search history.

(56) References Cited

U.S. PATENT DOCUMENTS

| | | | | |
|---|---|---|---|---|
| 1,210,727 | A * | 1/1917 | Tyson | B01F 27/071 366/326.1 |
| 3,322,401 | A * | 5/1967 | Mersch | B01F 27/1152 366/326.1 |
| 10,828,612 | B1 * | 11/2020 | Pamplin | A47J 43/085 |
| 2016/0167777 | A1 * | 6/2016 | Podgurski | B64C 27/37 416/147 |
| 2022/0322881 | A1 * | 10/2022 | Pamplin | A47J 43/0716 |

\* cited by examiner

*Primary Examiner* — David L Sorkin
(74) *Attorney, Agent, or Firm* — Esplin & Associates, PC

(57) ABSTRACT

A blender with addressable blades configured to blend foodstuffs using different blending modes of operation is disclosed. Exemplary implementations may include includes a blade assembly, a base assembly, a container assembly, a control interface, and control circuitry, and/or other components. The blender includes a control interface configured to be manually engaged by the user. The control interface controls the operating mode of the blender, including a ready-to-blend mode and a first blending mode. During the ready-to-blend mode, the blender is not blending and during the first blending mode the blender is blending, with the individual blades of the blade assembly at a particular angle.

10 Claims, 7 Drawing Sheets

BLENDER WITH ADDRESSABLE BLADES

FIELD OF THE DISCLOSURE

The present disclosure relates to blenders with addressable blades, the blenders being configured to blend foodstuffs.

BACKGROUND

Blenders are known, typically as consumer-grade home appliances, or commercial-grade appliances.

SUMMARY

One aspect of the present disclosure relates to a blender with addressable blades. The blender is configured to blend foodstuffs. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. Lack of an external power source, much less a reliable external power source, is no longer preventing users from enjoying blended drinks. By virtue of the blades being addressable, the blender may be capable of adjusting the blade angle (i.e., pitch of the blades) to optimize the blending modes of operation.

The blender may include a blade assembly, a base assembly, a container assembly, a control interface, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients.

Another aspect of the present disclosure is a method for controlling operations of a blender with addressable blades configured to blend foodstuffs using different blending modes of operation. The different blending modes of operation may include a ready-to-blend mode, a first blending mode, and/or other blending modes of operation. The blender may include a blade assembly, a base assembly, a container assembly, a control interface, control circuitry, and/or other components. The method may include controlling an electrical motor included in the base assembly in accordance with the different blending modes of operation. By way of non-limiting illustration, in the first blending mode, the electrical motor may be controlled to accomplish the blending rotation of the blade assembly. In some implementations, the method may include controlling the movement of a slant disk along a column of the blade assembly in accordance with the different blending modes of operation. By way of non-limiting illustration, in the first blending mode, the slant disk may be positioned at a first position along the column. Responsive to the slant disk being in the first position along the column, individual connecting rods may effectuate the longitudinal rotation of individual blades included in the blade assembly such that the individual blades are positioned at a first angle. The first angle of the individual blades and the first position of the slant disk along the column may be associated with the first blending mode and/or other blending modes of operation. The method may include making detections regarding user input received by the control interface. The detections may include a first type of detections and/or other types of detections. The first type of detections may indicate occurrences of the control interface receiving a first type of user input. The method may include, responsive to a first detection of the first type of detections, effectuating a particular movement of the slant disk from an initial position along the column to the first position along the column, such that the individual blades may be positioned at the first angle. The method may include, further responsive to a first detection of the first type of detections, effectuating a transition from the ready-to-blend mode to the first blending mode.

As used herein, any association (or relation, or reflection, or indication, or correspondency) involving assemblies, blending components, blades, slant disks, motors, rotational axes, longitudinal axes, diameters, batteries, couplings, interfaces, buttons, detectors, indicators, magnetic elements, caps, rotations, modes of operation, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
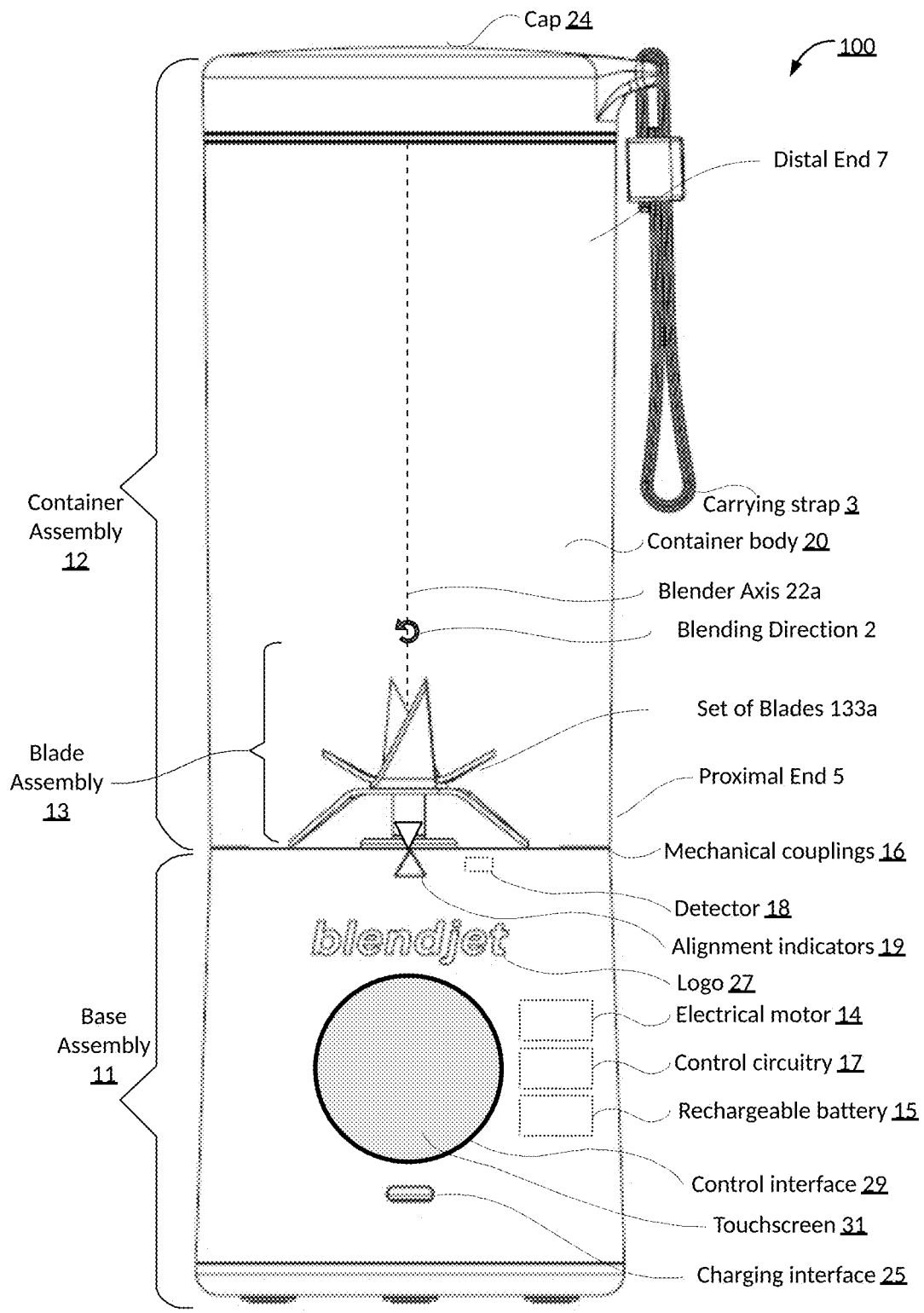
FIG. 1 shows a front view of a blender with addressable blades configured to blend foodstuffs, in accordance with one or more implementations.

FIG. 1 shows a blender (hereinafter blender 100) configured to blend foodstuffs, in accordance with one or more implementations. Blender 100 may include one or more of a base assembly 11, a container assembly 12, a blade assembly 13, control circuitry 17 (depicted in FIG. 1 as a dotted rectangle to indicate this component may be embedded within base assembly 11, and not readily visible from the outside), and/or other components. Base assembly 11, container assembly 12, and/or blade assembly 13 may be configured to be coupled during blending by blender 100. For example, in some implementations, base assembly 11, container assembly 12, and/or blade assembly 13 may be mechanically coupled, e.g., through one or more threaded couplings. Other types of couplings may be envisioned for blender 100, though leak-proof options may be preferred, since most uses include one or more liquid ingredients. In some implementations, control circuitry 17 and/or other components may be included in base assembly 11, e.g., completely or partially within base assembly 11. For example, one or more of control circuitry 17, electrical motor 14, rechargeable battery 15, and/or other components may be integrated permanently into base assembly 11 such that base assembly 11 forms an integral whole. In some implementations, blender 100 is a portable blender.

Blender 100 may be configured to operate in at least two different modes of operation, including a ready-to-blend mode, a first blending mode, and/or other blending modes of operation. For example, blender 100 may not be blending during the ready-to-blend mode. Blender 100 may be blending during the first blending mode and/or during other blending modes of operation. During blending, electrical motor 14 may drive blending rotation of blade assembly 13. In some implementations, blender 100 may include a second blending mode and/or other blending modes of operation during which blender 100 may be blending.

Base assembly 11 may include one or more of a base body 11*b* (FIG. 5), an electrical motor 14 (depicted in FIG. 1 as a dotted rectangle to indicate this component may be embedded within base assembly 11), a rechargeable battery 15 (depicted in FIG. 1 as a dotted rectangle to indicate this component is embedded within base assembly 11), a standardized charging interface 25, one or more mechanical couplings 16, a detector 18, one or more alignment indicators 19, a control interface 29, a logo 27 (which may visually refer to a corporate identity), and/or other components.

Figure 4:
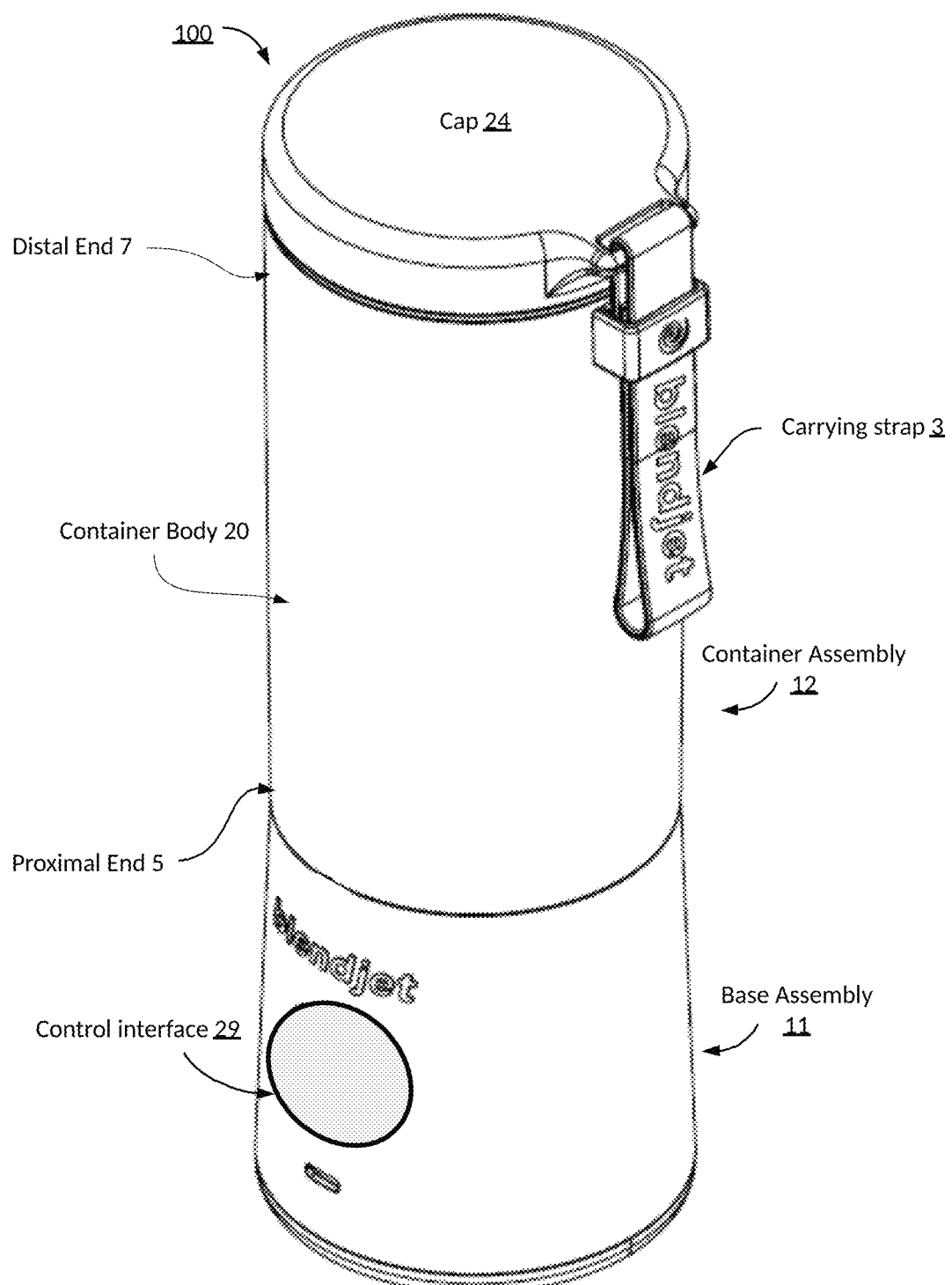
FIG. 4 shows a top view of a blender with addressable blades, in accordance with one or more implementations.

Referring to FIG. 1, proximal end 5 of container assembly 12 may be disposed near blade assembly 13 during blending of blender 100. Distal end 7 of container assembly 12 may be disposed opposite proximal end 5. Referring to FIG. 4, cap 24 may be disposed at or near distal end 7 of container assembly 12. In some implementations, cap 24 may be removable. For example, removing cap 24 may create an opening at distal end 7 of container assembly 12. In some implementations, blended foodstuffs may be removed through this opening, e.g., by pouring. In some implementations, carrying strap 3 may be configured for the user to carry blender 100. In some implementations, carrying strap 3 may be attached to cap 24 as depicted in FIGS. 1 and 4. Alternatively, in some implementations, carrying strap 3 may be attached to container assembly 12, e.g., to container body 20.

In some implementations, one or more mechanical couplings 16 may include threaded couplings. For example, one or more mechanical couplings 16 may include a first mechanical coupling in base assembly 11 and a matching mechanical coupling in container assembly 12. In some implementations, the first mechanical coupling included in base assembly 11 may be a female threaded coupling configured to fit together with the matching mechanical coupling of container assembly 12. The first mechanical coupling and the matching mechanical coupling may be configured to (temporarily and detachably) couple base assembly 11 to container assembly 12.

A mechanical coupling included in container assembly 12 may be disposed at or near proximal end 5 of container assembly 12. This mechanical coupling may be configured to engage the first mechanical coupling to couple base assembly 11 to container assembly 12. In some implementations, the first mechanical coupling and the matching mechanical coupling may be threaded couplings. In some implementations, one or more of mechanical couplings 16 may have parallel threads.

Figure 6A:
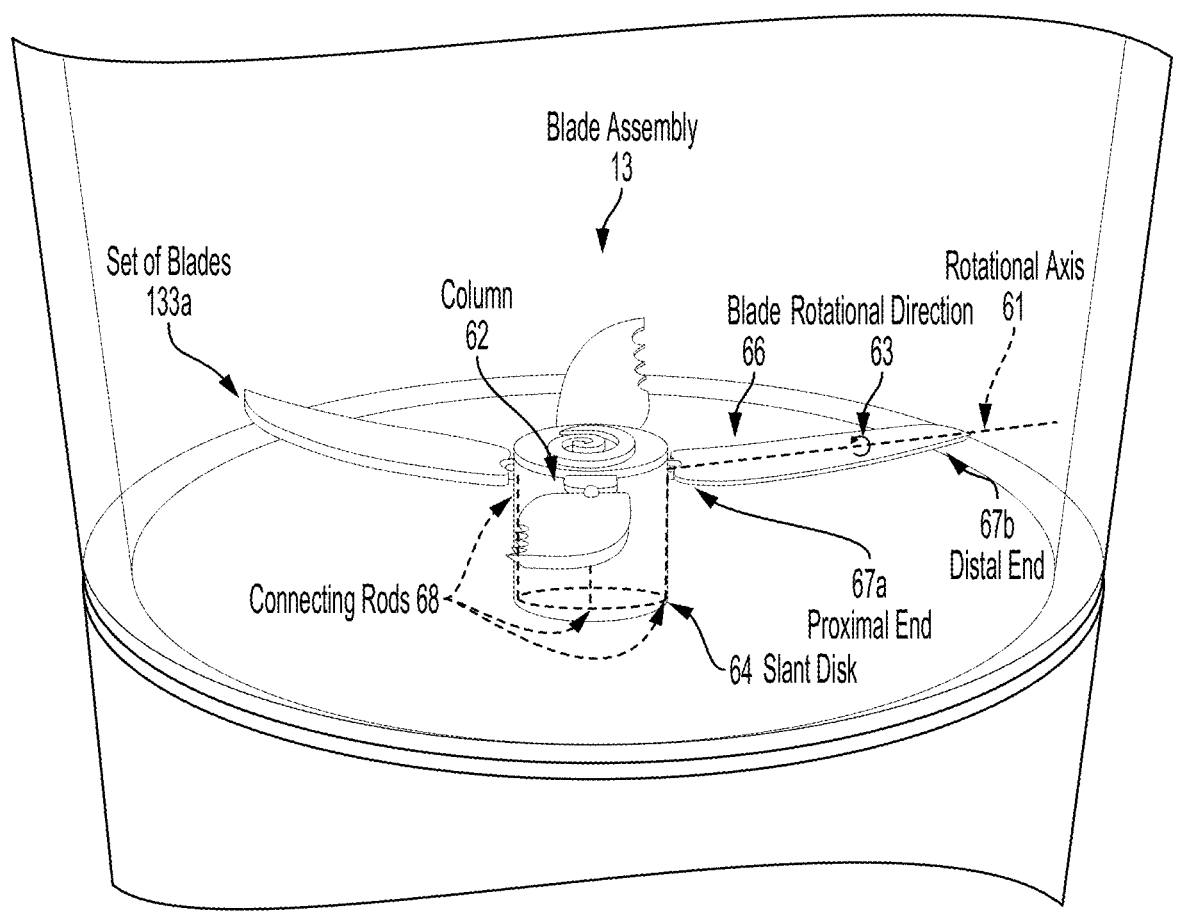
FIG. 6A-B show partial front views of a blade assembly of a blender with addressable blades, in accordance with one or more implementations.

Referring to FIG. 6A, blade assembly 13 may include one or more structural components configured to blend foodstuffs, including but not limited to one or more of a set of blades 133*a*, a central column 62, a slant disk 64 (depicted as a dotted horizontal circle to show it may be embedded within column 62 and not readily visible), one or more connecting rods 68 (depicted as vertical dotted lines to show they may be embedded within column 62 and not readily visible), and/or other structural components configured to change the angle of one or more blades of set of blades 133*a*. In some implementations, blade assembly 13 may be rotatable mounted to base assembly 11 to blend foodstuffs. In some implementations, blade assembly 13 may be capable of being removed from base assembly 11 (e.g., for purposes of cleaning blade assembly 13 and/or base assembly 11). Blade assembly 13 may be mounted to base assembly using mechanical or magnetic couplings, including, for example, threaded couplings. By way of non-limiting illustration, base assembly 11 may include a set of mechanical couplings that are intended to couple with a matching set of mechanical couplings on blade assembly 13.

Set of blades 133*a* may include one or more individual blades, such as blade 66. Blade 66 may be attached to column 62 by one or more of a hinge, a joint, ball-and-socket joints, and/or other mechanisms of attachment. In some implementations, blade 66 may be permanently mounted to column 62 (i.e., incapable of being detached from column 62, at least during regular use by a user). Blade 66 may include a proximal end 67*a* (at or near column 62) and a distal end 67*b* that is opposite proximal end 67*a*. Blade 66 may be mounted and/or attached to column 62 at or near proximal end 67*a*. In some implementations, blade 66 may taper towards proximal end 67*a* and/or distal end 67*b*. For example, distal end 67*b* of blade 66 may be a tip and/or sharp point that maximizes the blending of foodstuffs during use of blender 100. In some implementations, individual blades such as blade 66 may include a sharp and/or serrated edge between proximal end 67*a* and distal end 67*b*, to cut foodstuffs during use of blender 100.

Blade 66 may be rotatable about the point (or area of engagement) at which blade 66 is attached to column 62. In some implementations, the rotation of the individual blades about the point of attachment to column 62 may be defined by a (blade-specific longitudinal) rotational axis, a rotation direction, and/or other elements. For example, blade 66 may include a (blade-specific longitudinal) rotational axis 61, depicted as a dotted line through blade 66 to indicate it may be not a physical axis, that runs from proximal end 67*a* to distal end 67*b*. In some implementations, rotation of individual blades of the set of blades 133*a* may include individual rotational axes defined by the proximal ends and/or the distal ends of the individual blades. In other words, each individual blade may have a unique or specific rotational axis that is different to a rotational axis of another blade in the set of blades 133a. Rotational direction 63 of blade 66 may indicate the direction in which blade 66 rotates about the (point) attachment to column 62. For example, rotational direction may be clockwise or counterclockwise. In some implementations, the individual blades of the set of blades 133a may have the same rotational direction.

Figure 6B:
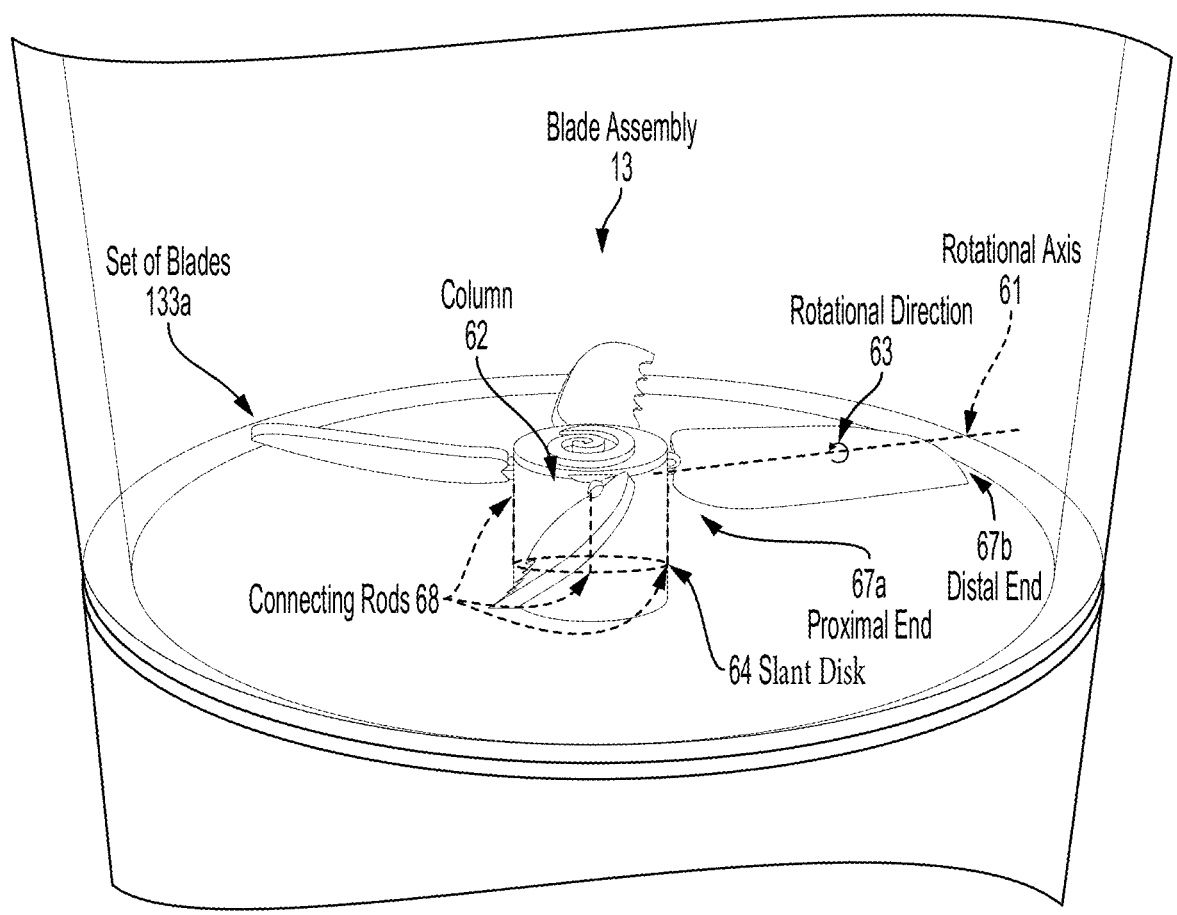

In some implementations, the rotation of blade 66 around rotational axis 61 may be responsive to the (vertical) displacement of (horizontally oriented) slant disk 64 along the height of column 62. For example, FIG. 6A may show slant disk 64 at an initial position and/or a default position along column 62 (here, near the bottom of column 62 where it engages with the top surface of base assembly 11 as depicted). The initial position may be associated with a particular mode of operation, e.g., with the ready-to-blend mode. In other words, the slant disk may be in the initial position while blender 100 is in the ready-to-blend mode and/or other blending modes associated with the initial position. In some implementations, movement and/or displacement of slant disk 64 may be controlled by electric motor 14. For example, electric motor 14 may be configured to control movement of slant disk 64 from the initial position (as shown in FIG. 6A) to a first position (as shown in FIG. 6B). In some implementations, the movement of slant disk 64 from the initial position up to the first position may be responsive to control interface 29 receiving user input. Slant disk 64 may be positioned at one or more positions along the height of column 62 (or, in some cases, below column 62). In some implementations, one or more connecting rods 68 may be configured to attach slant disk 64 to individual blades of set of blades 133a. A first end of the individual connecting rods 68 may be configured to couple with individual blades at or near the hinge, joint, tilting arm, and/or other attachment mechanism that attaches the individual blade to column 62. A second end of the individual connecting rods 68 may be configured to couple with slant disk 64. In some implementations, connecting rods 68 may be permanently mounted to slant disk 64. Individual connecting rods 68 may be coupled to the individual blades such that vertical movement of the connecting rods 68 may drive rotation of the individual blades around the individual rotational axes (and adjustments of the angles of the individual blades). By virtue of the individual connecting rods 68 being coupled to slant disk 64, (vertical) movement of slant disk 64 along the height of column 62 may result in a proportional (angular) movement of the individual connecting rods 68. In some implementations, blender 100 may include a swashplate instead of a slant disk. In some implementations, blender 100 may include another structural component that provides a mechanism that converts vertical movement (i.e., along the height of column 62) into a change of the (blade) angle of individual blades in set of blades 133a).

The position of slant disk 64 and/or connecting rods 68 may characterize an angle (i.e., pitch) of the individual blades of the set of blades 133a. In some implementations, the angle of the individual blades may be relative to the rotational axis of the individual blade, the upper surface of base assembly 11, and/or other components of blender 100. The different blending modes of operation may be associated with different angles of the individual blades. For example, the ready-to-blend mode may be associated with a default/initial angle. In some implementations, the initial angle may be 0 degrees relative to the top surface of base assembly 11. In some implementations, the initial angle may range between-10 and 10 degrees relative to the top surface of base assembly 11. In some implementations, the initial angle may range between-20 and 20 degrees relative to the top surface of base assembly 11.

In some implementations, the initial angle may range between 0 and 30 degrees relative to the top surface of base assembly 11. In some implementations, the initial angle may range between 0 and 45 degrees relative to the top surface of base assembly 11. The first blending mode of operation may be associated with a first angle. The second blending mode of operation may be associated with a second angle. The third blending mode of operation may be associated with a third angle, and so on and so forth. In some implementations, the angle associated with a given blending mode may indicate the angle at which the blades are positioned during the given blending mode. For example, during the first blending mode, the individual blades of the set of blades are positioned in the first angle. In some implementations, the angle of the individual blades of the set of blades 133a may have a range of 30 degrees, 45 degrees, 60 degrees, 90 degrees, 180 degrees, 360 degrees, and/or another range.

In some implementations, column 62 may be configured to move up and down. The movement of column 62 may be driven by electric motor 14 and/or other components of blender 100. In some implementations, column 62 may be in a deployed position (as shown in FIG. 6A-B). Column 62 may be in the deployed position when the blender is turned on and/or during one or more blending modes of operations. Responsive to column 62 being in the deployed position, set of blades 133a may be positioned above the top surface of base assembly 11, such that the individual blades of set of blades 133a do not contact with the top surface of base assembly 11. In some implementations, column 62 may be configured to move downward into a retracted position. In the retracted position, a portion of column 62 may be positioned within base assembly 11 and/or not visible to the user. In some implementations, the top surface of base assembly 11 may include one or more indentations. The one or more indentations may approximately the same shape and/or depth of the individual blades of the set of blades 133a. In some implementations, the number of indentations may be the same as the number of individual blades in the set of blades 133a. Responsive to column 62 being in the retracted position, the individual blades of the set of blades 133a may be positioned in the one or more indentations on the top surface of base assembly 11, such that the blades are flush with the top surface of base assembly 11.

Referring to FIG. 1, blender axis 22a is depicted as a geometric 2-dimensional line extending indefinitely through blade assembly 13, and is not a physical axis. Rather, blender axis 22a indicates how blade assembly 13 rotates in relation to other components of blender 100, in a blending direction 22b, during blending. In some implementations, blade assembly 13 may be mounted permanently to base assembly 11. In some implementations, blade assembly 13 may be disposed at or near proximal end 5 of container assembly 12 during blending by blender 100. In some implementations, set of blades 133a may include 1, 2 (as shown in FIG. 6A), 3, 4, 5, or more pairs of blades. In some implementations, a pair of blades may include two blades on opposite sides of blender axis 22a. In some implementations, a pair of blades may have two blades such that the distal ends of these two blades are at the same horizontal level. In some implementations, as depicted in the upright configuration of blender 100 in FIG. 1, set of blades 133a may include six blades that form 3 pairs of blades. In some implementations, set of blades 133a may include at least two downward blades, which may prevent and/or reduce foodstuffs remaining unblended when disposed under the upward blades. In some implementations, set of blades 133a may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (when compared to blenders that are connected to common outlets), such as disclosed herein. As used herein, directional terms such as upward, downward, left, right, front, back, and so forth are relative to FIG. 1 unless otherwise noted.

Figure 5:
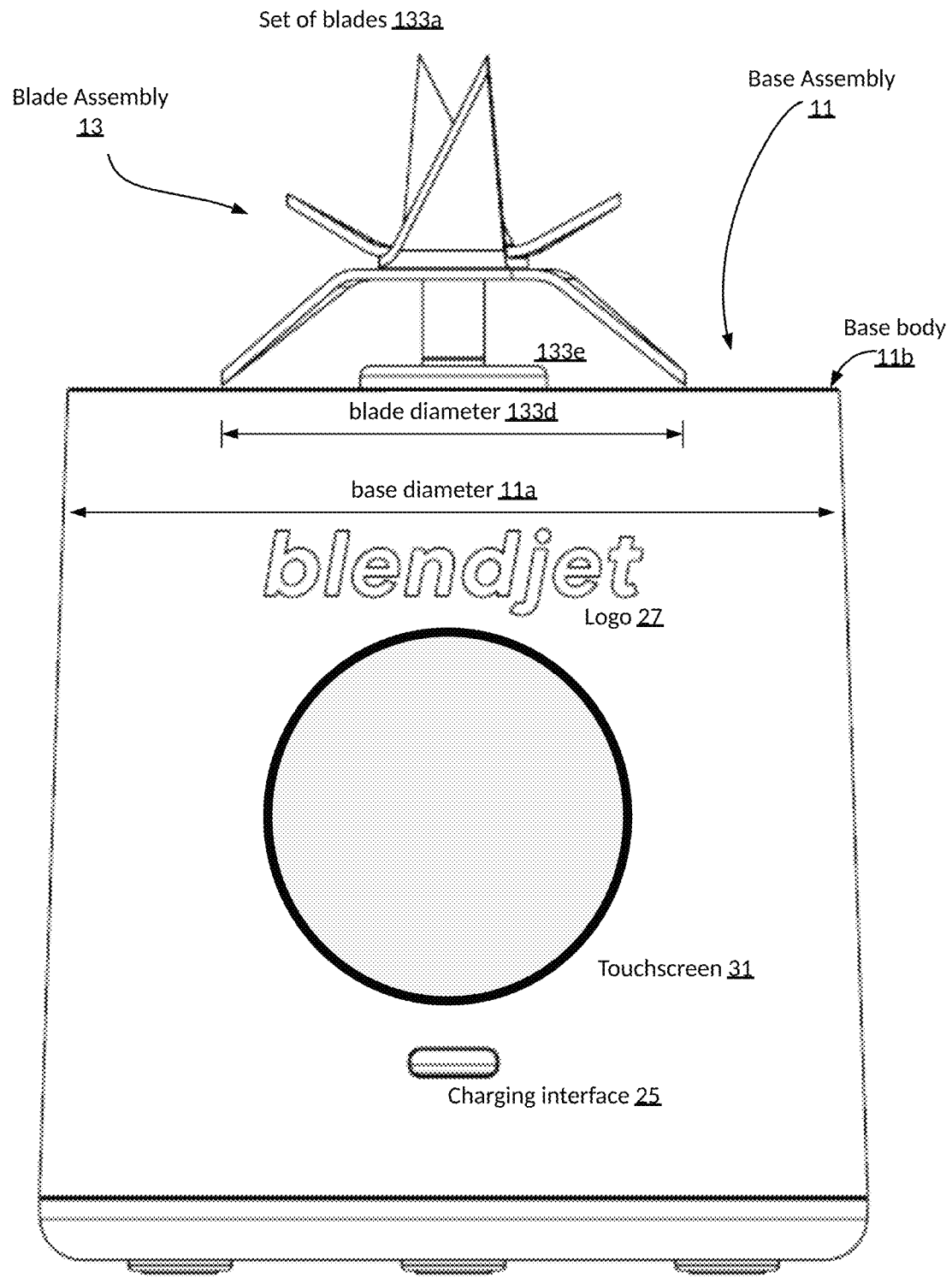
FIG. 5 shows a front view of a base assembly of a blender with addressable blades, in accordance with one or more implementations.

Referring to FIG. 1, in some implementations, base assembly 11 may have a cylindrical shape (apart from blade assembly 13 and/or set of blades 133a). For example, horizontal cross-sections of base assembly 11 may have a circular shape. In some implementations, the cylindrical shape of base assembly 11 may have a diameter between 2 and 4 inches, which may be referred to as a base diameter. In some implementations, the cylindrical shape of base assembly 11 may have a base diameter between 3 and 3.5 inches. Such a base diameter may improve portability, as well as allow blender 100 to be stored in a cup holder, e.g., in a vehicle. For example, FIG. 5 shows a front view of base assembly 11, depicting a blade diameter 133d (e.g., the diameter of the circle described by rotation of the distal ends of the lowest pair of blades in set of blades 133a) and a base diameter 11a (as measured at or near the top of base assembly 11). In some implementations, blade diameter 133d may refer to the largest diameter of any circle described by rotation of distal ends of pairs of blades in set of blades 133a (or other distal ends of blade assembly 13), as measured perpendicular to rotation. In some implementations, the orientation of blade diameter 13d may be orthogonal to the direction of blender axis 22a. In some implementations, the plane of rotation of the distal ends of the blades (or other distal ends of blade assembly 13) that define blade diameter 133d may be orthogonal to the direction of blender axis 22a. In some implementations, blade diameter 133d may be at least 50% of base diameter 11a. In some implementations, blade diameter 133d may be about 60% of base diameter 11a. In some implementations, blade diameter 133d may range between 50% and 70% of base diameter 11a. In some implementations, blade diameter 133d may range between 60% and 70% of base diameter 11a. In some implementations, blade diameter 133d may range between 60% and 80% of base diameter 11a. As used herein, phrases pertaining to dimensions, such as various diameters, may refer to either blade assembly 13, set of blades 133a, and/or both. For example, blade diameter 13d may refer to a blending bar, or to set of blades 133a, and/or to other types of blending components.

In some implementations, blade assembly 13 may be mounted permanently on base assembly 11 such that base assembly 11 forms an integral whole. In some implementations, base assembly 11 may have a conical shape, wherein the bottom of the conical shape may have a diameter between 2 and 4 inches, and wherein the top of the conical shape may have a diameter between 2 and 4 inches. For example, the bottom of base assembly 11 may be wider than the top of base assembly 11, as depicted in FIG. 5.

Referring to FIG. 4, container assembly 12 may include one or more of a proximal end 5, a distal end 7, container body 20, a cap 24, a carrying strap 3, and/or other components. Container body 20 may form a vessel to hold and/or contain foodstuffs within container assembly 12. In some implementations, container body 20 may be a cylindrical body and/or have a cylindrical shape. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes. As shown in FIG. 1, in some implementations, the cylindrical shapes of container assembly 12 and/or container body 20 may have a container diameter between 2 and 4 inches (as measured at or near the bottom of container body 20). In some implementations, container body 20 may have a container diameter at or near cap 24. In some implementations, these container diameters may be between 3 and 3.5 inches. In some implementations, container body 20 may be transparent. In some implementations, blade diameter 133d (see FIG. 5) may be at least 50% of the smallest container diameter. In some implementations, blade diameter 13d may be about 60% of the smallest container diameter. In some implementations, blade diameter 13d may range between 50% and 70% of the smallest container diameter. In some implementations, blade diameter 13d may range between 60% and 70% of the smallest container diameter. In some implementations, blade diameter 13d may range between 60% and 80% of the smallest container diameter.

Referring to FIG. 1, electrical motor 14 may be configured to rotationally drive blade assembly 13. In some implementations, electrical motor 14 may operate at a voltage between 5V and 10V. In one or more preferred implementations, electrical motor 14 may operate at a voltage of about 7.4V. In some implementations, electrical motor 14 may be configured to spin blade assembly 13 at a maximum speed between 15,000 rotations per minute (RPM) and 35,000 RPM. In one or more preferred implementations, electrical motor 14 may spin blade assembly 13 at a maximum speed of about 22,000 RPM. Electrical motor 14 may be configured to be powered by rechargeable battery 15. Simultaneously, in some implementations, electrical motor 14 may be further configured to be powered through standardized charging interface 25, though that may not be the preferred way of operating blender 100. In one or more preferred implementations, no power is (or need be) supplied to electrical motor 14 from an external power source during blending by blender 100. In some implementations, control circuit 17 may be configured to control electrical motor 14 during rotation of blade assembly 13.

Referring to FIG. 1, rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable. In some implementations, rechargeable battery 15 may be user-replaceable. In some implementations, rechargeable battery 15 may be store-bought. In some implementations, rechargeable battery 15 may have a capacity between 1000 mAh and 6000 mAh. In one or more preferred implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Standardized charging interface 25 may be configured to conduct electrical power to rechargeable battery 15. In some implementations, standardized charging interface 25 may be configured to conduct electrical power to charge rechargeable battery 15, e.g., from an external power source. In some implementations, standardized charging interface 25 may be configured to support wireless charging of rechargeable battery 15, e.g., from an external power source, including but not limited to induction-based charging. In some implementations, standardized charging interface 25 may be a universal serial bus (USB) port configured to receive an electrical connector for charging rechargeable battery 15. In such a case, the electrical connector may be connected to an external power source. In some implementations, standardized charging interface 25 may be covered for protection and/or other reasons.

Detector 18 may be configured to detect whether first mechanical coupling 16*a* of base assembly 11 is engaged with another mechanical coupling of container assembly 12. In some implementations, detector 18 may be configured to detect whether base assembly 11 is coupled to container assembly 12 in a manner operable and suitable for blending by blender 100. In some implementations, operation of detector 18 may use one or more magnetic elements. For example, in some implementations, one or more magnetic elements are included in container body 20 at or near proximal end 5 of container assembly 12. Engagement may be detected responsive to these one or more magnetic elements being aligned and sufficiently close to one or more matching magnetic elements that may be included in base assembly 11 (e.g., at or near first mechanical coupling 16*a* of base assemble 11). In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

Control interface 29 may be part of the user interface of blender 100. Control interface 29 may be configured to be engaged manually by the user, for example by pushing control interface 29 to turn blender 100 on and off. In some implementations, control interface 29 may include a power button configured to be manually engaged by the user. In some implementations, control interface 29 may include a touchscreen 31 (as depicted in FIG. 1) configured to be manually engaged by the user. In some implementations, control interface 29 may support multiple types of manual engagement (e.g., including gestures by the user on touchscreen 31), including but not limited to a first type of manual engagement, a second type of manual engagement, a third type of manual engagement, and so forth. By way of non-limiting example, the first type of manual engagement may include pressing the power button and holding the power button depressed for at least a specified duration. For example, the specified duration may be at least 3 seconds, at least 4 seconds, at least 5 seconds, and/or another specified duration. By way of non-limiting example, the second type of manual engagement may be different from the first type of manual engagement. Other types of manual engagement may be contemplated within the scope of this disclosure, including but not limited to patterns of pressing and releasing the power button. In some implementations, control interface 29 may be configured to detect whether a particular type of manual engagement of control interface 29 by the user occurred.

In some implementations, control interface 29 may be configured to facilitate transitions between different modes of operation of blender 100. In some implementations, a transition may go from the ready-to-blend mode to the first blending mode, and/or vice versa. In some implementations, transitions between different modes of operation may occur responsive to detection of one or more particular types (or patterns) of manual engagement of control interface 29.

In some implementations, touchscreen 31 may be curved to match the cylindrical and/or conical shape of base assembly 11. In some implementations, touchscreen 31 may sit flush on base assembly 11. In some implementations, touchscreen 31 may include one or more of a lens, a glass top, an optical element, and/or other components. In some implementations, touchscreen 31 may be flat (i.e., level) and include a curved (topical) lens. The lens may be curved to match the cylindrical and/or conical shape of base assembly 11. The lens may be positioned on top of touchscreen 31 and/or may give the appearance that touchscreen 31 is curved. In some implementations, touchscreen 31 may protrude out from base assembly 11, such that the edge of touchscreen 31 creates a lip with base assembly 11. In some implementations, the lip of touchscreen 31 may have a height of 1 millimeters, 2 millimeters, 3 millimeters, and/or other measurements. In some implementations, the lip may surround the circumference of touchscreen 31.

In some implementations, control interface 29 may include one or more touchscreens, such as touchscreen 31. For example, touchscreen 31 may be configured to receive user input. As used herein, user input of a touchscreen may include one or more of tapping touchscreen 31, multiple consecutive occurrences of tapping on touchscreen 31, swiping touchscreen 31 (e.g., horizontally, vertically, and/or diagonally), and/or other user gestures (by way of non-limiting example, a circular swipe or gesture) or user interactions with touchscreen 31, and these may be considered types of manual engagement of control interface 29. In some implementations, control interface 29 includes exactly one touchscreen (i.e., touchscreen 31). For example, in some implementations, touchscreen 31 may be the only user-manipulatable portion of control interface 29, such that no other user interface component controls the operation of blender 100, or the transitions between different modes of operation used by blender 100.

In some implementations, control by a user of blender 100 may be based on a switch (not shown), a button, touchscreen 31, voice-controlled operation (not shown), gesture-based operation (not shown), and/or other types of user interfaces suitable to turn consumer appliances on and off. Control interface 29 may be configured to illuminate in various colors (red, blue, purple, etc.) and/or patterns (solid, fast blinking, slow blinking, alternating red and blue, etc.). Control interface 29 may convey information regarding the operational status of blender 100 to a user (e.g., the current mode of operation). The operation status of blender 100 may be determined by control circuitry 17. Control interface 29 may be controlled by control circuitry 17. For example, if control interface 29 is solid purple, blender 100 may be charging and/or insufficiently charged to blend. For example, if control interface 29 is solid blue, blender 100 may be ready for blending. For example, if control interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and control interface 29 may warn the user when the treaded couplings are not tightened sufficiently.

Control circuitry 17 may be configured to control different functions and/or operations of blender 100, including but not limited to turning blender 100 on and off, transitioning between different modes of operation, charging of rechargeable battery 15, controlling of electrical motor 14 regarding and/or during rotation of blade assembly 13, determining whether mechanical couplings 16 are engaged properly for blending, controlling operation of control interface 29, driving rotation of individual blades of the set of blades 133a, and/or performing other functions for blender 100. In some implementations, control circuitry 17 may be configured to prevent rotation of blade assembly 13 responsive to a determination that mechanical couplings 16 are not engaged (or not engaged properly for the intended operation of blender 100). In some implementations, control circuitry 17 may be configured to control control interface 29 to convey information regarding the operational status of blender 100 to a user. For example, control interface 29 may include a light that can illuminate in various colors and/or patterns. In some implementations, control circuitry 17 may be implemented as a printed circuit board (PCB).

In some implementations, control circuitry 17 may be configured to make detections regarding one or more touchscreens of control interface 29. For example, control circuitry 17 may be able to detect whether touchscreen 31 has received (one or more types of) user input. User input may include one or more of the user single tapping, double tapping, swiping (horizontally from left to right, horizontally from right to left, vertically from top to bottom, vertically from bottom to top, and/or other types of swiping), tapping and holding, and/or other interactions or types of user input received through touchscreen 31. Control circuitry 17 may be configured to make different types of detections based on user input, including but not limited to first, second, and third types of detections. A first type of detections may indicate occurrences of the user touching touchscreen 31 in a first manner. A second type of detection may indicate occurrences of the user touching touchscreen 31 in a second manner that differs from the first manner. A third type of detection may indicate occurrences of the user touching touchscreen 31 in a third manner that differs from the first manner and the second manner, and so forth. In some implementations, touchscreen 31 may include one or more selection regions. Selection regions may include visible and invisible boundaries that divide the area of touchscreen 31 into separate selection regions. For example, touchscreen 31 may include one of more of two regions, three regions, four regions, six regions, and/or other numbers of regions. By way of non-limiting example, touchscreen 31 may be divided into two selection regions. In some implementations, the two regions may include the top half of touchscreen 31 and the bottom half of touchscreen 31. In some implementations, the two regions may include the left half of touchscreen 31 and the right half of touchscreen 31. In some implementations, the user touching the top half region may indicate occurrences of a particular type of detections and the user touching the bottom half region may indicate occurrences of a different particular type of detections. In some implementations, the user touching the left half region may indicate occurrences of a given type of detections and the user touching the right half region may indicate occurrences of a different type of detections. In some implementations, swiping left-to-right may be a different type of detection than swiping right-to-left. In some implementations, swiping top-to-bottom may be a different type of detection than swiping bottom-to-top.

By way of non-limiting illustration, FIG. 6A shows slant disk 64 at the initial position along column 62. Responsive to slant disk 64 being at the initial position, the individual blades of the set of blades 133a (such as blade 66) may be positioned at an initial angle. The initial position of slant disk 64 along column 62 and/or the resulting initial angle of the individual blades may be associated with the ready-to-blend mode. In some implementations, responsive to a first detection of the first type of detections, control circuitry 17 may be configured to effectuate a particular movement of slant disk 64 from the initial position along column 62 to the first position along column 62 (as shown in FIG. 6B). The particular movement of slant disk 64 may effectuate a movement of connecting rods 68 that is proportional to the particular movement of slant disk 64. In some implementations, the movement of connecting rods 68 (as a result of the particular movement of slant disk 64) may drive rotation of the individual blades of set of blades 133a. The rotation of the individual blades of set of blades 133a may effectuate a change in the angle of the individual blades. For example, FIG. 6B shows blade 66 positioned at the first angle, responsive to the particular movement of slant disk 64. In some implementations, the first angle may be about 20 degrees relative to the top surface of base assembly 11 (or, the differential between the initial angle and the first angle may be about 20 degrees, as illustrated in FIG. 6B). In some implementations, the differential between the initial angle and the first angle may be about 30 degrees, about 45 degrees, about 60 degrees, or another number of degrees. In some implementations, the first angle may range between minus 30 and 30 degrees relative to the top surface of base assembly 11. In some implementations, the initial angle may range between 30 and 45 degrees relative to the top surface of base assembly 11. In some implementations, the particular movement of slant disk 64 may occur a period of time before control circuitry 17 effectuates a transition from the ready-to-blend mode to the first blending mode. The period of time may be 1 second, 2 seconds, 3 seconds, and/or other durations of time. In some implementations, responsive to a second detection of the first type of detections, control circuitry 17 may effectuate a second particular movement of slant disk 64 from the first position along column 62 to a second position along column 62. The second particular movement may effectuate a movement of connecting rods 68 that corresponds to the second particular movement of slant disk 64. The movement of connecting rods 68 may drive rotation of the individual blades of the set of blades around the rotational (longitudinal) axes of the individual blades, such that the individual blades are positioned in a second angle. The second angle may be associated with the second blending mode.

In some implementations, column 62 may not include slant disk 64 and/or connecting rods 68. The rotation of the individual blades of the set of blades 133a may be driven and/or effectuated by electric motor 14 and/or another component of blender 100. For example, responsive to the first detection of the first type of detections, control circuitry 17 may be configured to control electric motor 14 to drive rotation of the individual blades of the set of blades around the rotational axes of the individual blades, such that the individual blades are rotated from the initial angle to the first angle. Responsive to a second detection of the first type of detections, control circuitry 17 may be configured to control electric motor 14 to drive rotation of the individual blades of the set of blades 133a around the rotational axes of the individual blades, such that the individual blades are rotated from the first angle to the second.

In some implementations, control circuitry 17 may be configured to control operations of control interface 29 to enable one or more transitions between displays and/or presentations presented via touchscreen 31 (e.g., different sets of information and/or different options for accepting user input). Displays may include one or more of a home menu, a settings menu, a selection menu, a recipe menu, and/or other menus and/or presentations. For example, the first display may be one or more of a home menu and/or other displays. The second display may be one or more of a selection menu, a settings menu, a recipe menu, and/or other menus and/or presentations. The second display may be different than the first display. In some implementations, particular transitions between presentations may occur responsive to particular type of detections regarding control interface 29 and/or touchscreen 31. For example, a particular selection on a home menu or selection menu may effectuate a transition to a particular mode of operation, such that the user can select either the first blending mode, the second blending mode, and/or other blending modes of operation. In some implementations, a particular selection on a particular menu may correspond to one or more angles of individual blades of the set of blades 133a and/or one or more blending modes of operation. In other words, the user may select, through touchscreen 31, for a particular angle of the individual blades to be associated with a particular blending mode operation.

In some implementations, control circuitry 17 may be configured to control operations of control interface 29 to enable the user to make modifications to one or more aspects of one or more modes of operation. Aspects of one or more modes of operations may include one of more of (default) time duration, blending strength, blending speed, number of rotations of the blending component, blending direction, the angle of individual blades, the position of the slant disk within the column, and/or other features of the mode of operation. In some implementations, modifications to one or more aspects of one of more modes of operation may occur responsive to an occurrence of a specific type of detections. By way of non-limiting example, modifications may occur after a transition from a first display to a settings menu display. In some implementations, the transition from the first display to the settings menu display may occur responsive to an occurrence of the second type of detections. In some implementations, the settings menu may appear on touchscreen 31 as a dial. The dial may include one or more indicators that correspond to the modifiable aspects of the modes of operation. For example, the user may mimic spinning and/or otherwise rotating the displayed dial as a form or type of user input. For example, the occurrence of certain types of detections may cause the dial to turn and the indicator to indicate a different time duration than the initial time duration, and, subsequently, may set the new time duration to the pertinent mode of operation. For example, rotation of set of blades 133a may by default be briefer in a cleaning mode of operation than in a blending mode of operation. In some implementations, a user may modify these default durations.

Figure 3A:
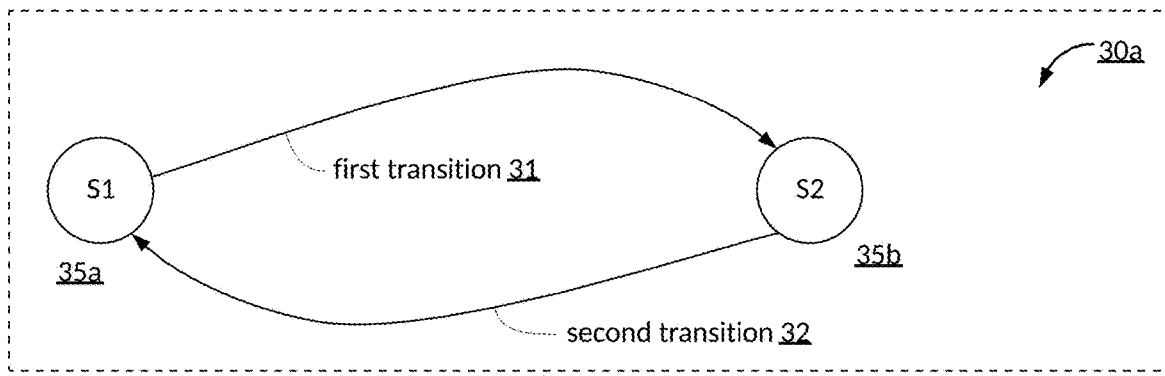
FIGS. 3A-3B-3C illustrate state transitions in state diagrams as may be used by a blender with addressable blades, in accordance with one or more implementations.

By way of non-limiting example, FIG. 3A illustrates state transitions in a state diagram 30a as may be used by blender 100, e.g., responsive to different types of detections regarding control interface 29 being manipulated by a user as described elsewhere in this disclosure. As depicted, state diagram 30a may include a first state 35a (labeled "S1") and a second state 35b (labeled "S2"). First state 35a may correspond to a ready-to-blend mode of blender 100 and the individual blades of the set of blades 133a may be positioned at a default angle. Second state 35b may correspond to a first blending mode of operation of blender 100 and the individual blades of the set of blades 133a may be positioned at a first angle. As depicted here, a first transition 31 may transition the mode of operation of blender 100 from first state 35a to second state 35b. A second transition 32 may transition the mode of operation of blender 100 from second state 35b to first state 35a. First transition 31 may occur responsive to detection of the first type of detections. Second transition 32 may occur automatically, e.g., after completion of a first blending operation.

Figure 3B:
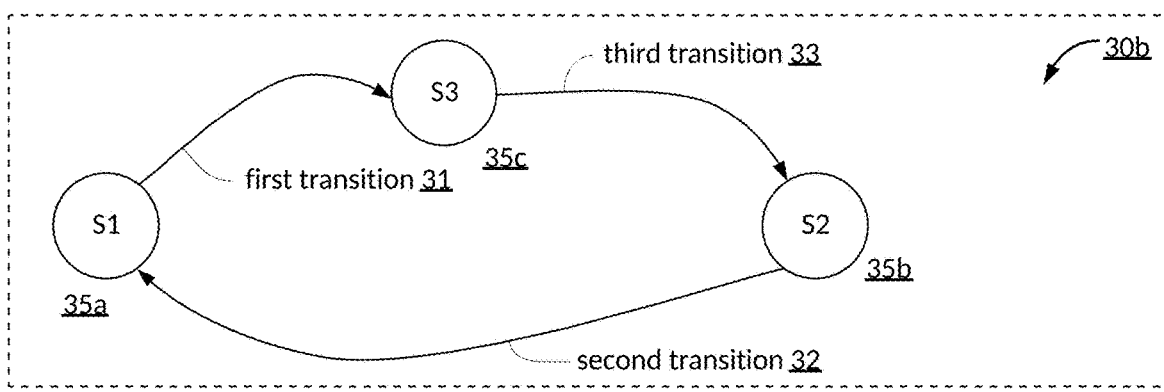

By way of non-limiting example, FIG. 3B illustrates state transitions in a state diagram 30b as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3A. Second state 35b may correspond to the first blending mode of blender 100 and the individual blades of the set of blades 133a may be positioned at the first angle. Third state 35c may correspond to the second blending mode of blender 100 and the individual blades of the set of blades 133a may be positioned at a second angle. As depicted in state diagram 30b, a first transition 31 may transition the mode of operation of blender 100 from first state 35a to third state 35c. A second transition 32 may transition the mode of operation of blender 100 from second state 35b to first state 35a. A third transition 33 may transition the mode of operation of blender 100 from third state 35c to second state 35b. First transition 31 may occur responsive to detection of a particular type of detections. Third transition 33 may occur responsive to detection of a different type of detections during third state 35c. Second transition 32 may occur automatically.

Figure 3C:
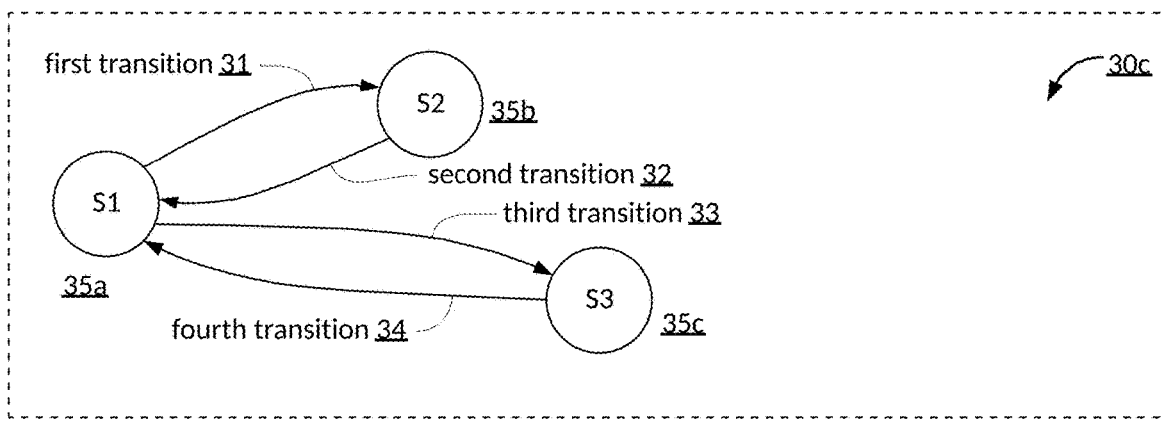

By way of non-limiting example, FIG. 3C illustrates state transitions in a state diagram 30c as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may correspond to a blending mode of operation. Second state 35b may correspond to a mode of operation of blender 100 in which the user can interact and/or modify settings of blender 100. Third state 35c may correspond to a blending mode of operation of blender 100. As depicted in state diagram 30b, a first transition 31 may transition the mode of operation of blender 100 from first state 35a to second state 35b. A second transition 32 may transition the mode of operation of blender 100 from second state 35b back to first state 35a. A third transition 33 may transition the mode of operation of blender 100 from first state 35a to third state 35c. First transition 31 may occur responsive to a particular type of detection. Second transition 32 may occur responsive to a different particular type of detection. Third transition 33 may occur responsive to yet another type of detection.

Figure 2:
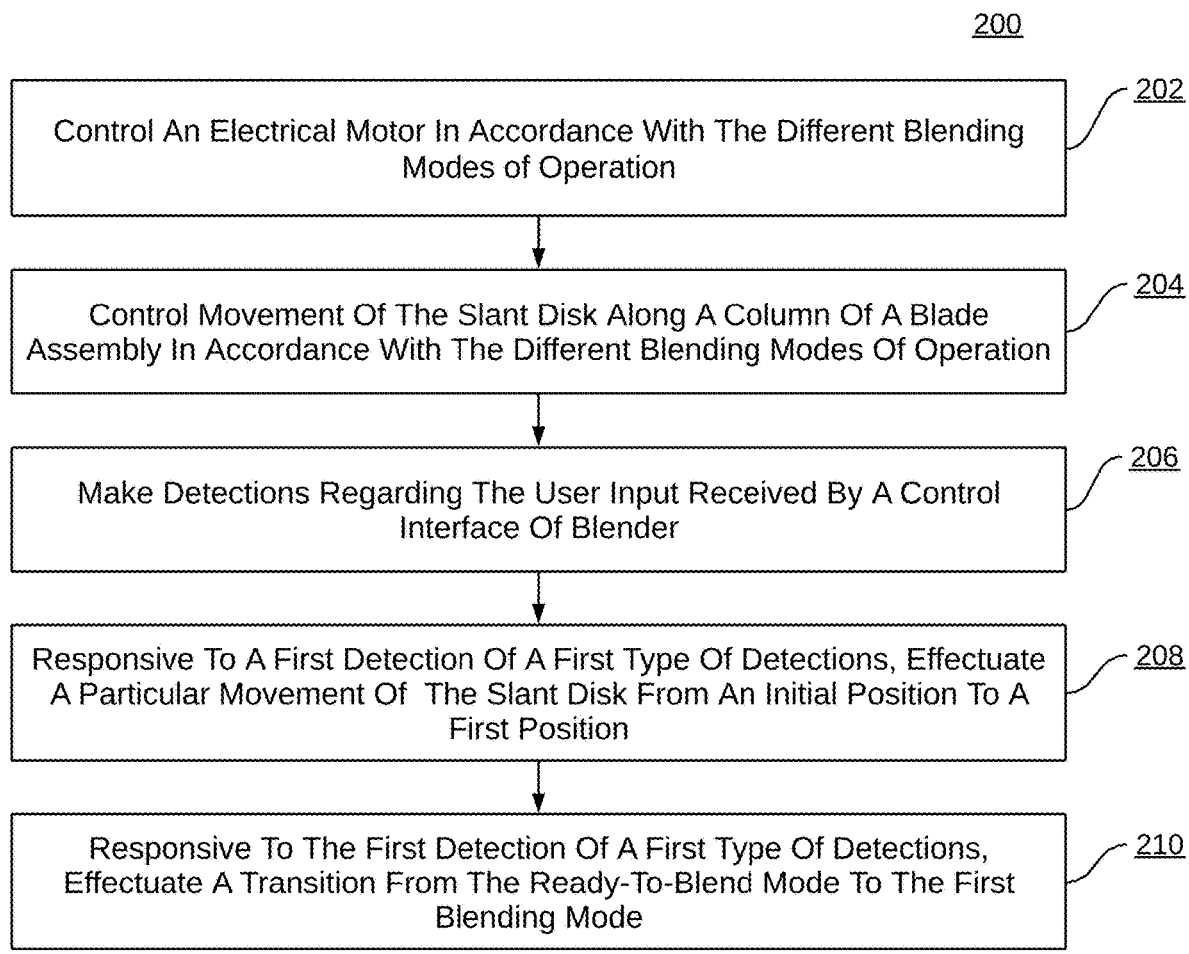
FIG. 2 shows a method for controlling operations of a blender with addressable blades, in accordance with one or more implementations.

FIG. 2 illustrates a method 200 for controlling operations of a blender with addressable blades configured to blend foodstuffs using different blending modes of operation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include controlling an electrical motor included in the base assembly in accordance with the different blending modes of operation. By way of non-limiting illustration, in the first blending mode the electrical motor may be controlled to accomplish the blending rotation of the blade assembly. In some embodiments, operation 202 is performed by a control circuitry the same as or similar to control circuitry 17 (shown in FIG. 1 and described herein).

An operation 204 may include controlling the movement of a slant disk along a column of the blade assembly in accordance with the different blending modes of operation. By way of non-limiting illustration, in the first blending mode the slant disk may be positioned at a first position along the column. Responsive to the slant disk being in the first position along the column, individual connecting rods may effectuate the longitudinal rotation of individual blades such that the individual blades are positioned at a first angle. The first angle and the first position along the column may be associated with the first blending mode. In some embodiments, operation 204 is performed by a control circuitry the same as or similar to control circuitry 17 (shown in FIG. 1 and described herein).

An operation 206 may include making detections regarding user input received by a control interface. The detections may include a first type of detections and/or other types of detections. The first type of detections may indicate occurrences of the control interface receiving a first type of user input. In some embodiments, operation 206 is performed by a control circuitry the same as or similar to control circuitry 17 (shown in FIG. 1 and described herein).

An operation 208 may include, responsive to a first detection of the first type of detections, effectuating a particular movement of the slant disk from an initial position along the column to the first position along the column, such that the individual blades are positioned at the first angle. In some embodiments, operation 208 is performed by a control circuitry the same as or similar to control circuitry 17 (shown in FIG. 1 and described herein).

An operation 210 may include, responsive to the first detection of the first type of detections, effectuating a transition from the ready-to-blend mode to the first blending mode. In some embodiments, operation 210 is performed by a control circuitry the same as or similar to control circuitry 17 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A blender with addressable blades configured to blend foodstuffs using different blending modes of operation, including a ready-to-blend mode and a first blending mode, the blender comprising:

a blade assembly that is configured to rotate around a rotational axis and blend the foodstuffs during blending by the blender, wherein the blade assembly includes:
  a column configured to rotate around the rotational axis during blending, wherein the column includes a proximal end and a distal end, wherein the blade assembly is configured to couple with a base assembly;
  a slant disk configured to move along the column between the proximal end of the column and the distal end of the column;
  a set of blades including at least two blades, wherein an individual blade of the set of blades extend outward from the column, wherein the individual blade includes a proximal end near the column and a distal end opposite the proximal end, wherein the individual blade includes a blade-specific longitudinal axis extending from the proximal end of the individual blade to the distal end of the individual blade, wherein the position of the individual blade along the blade-specific longitudinal axis characterizes an angle of the individual blade, and wherein longitudinal rotation of the individual blade along the blade-specific longitudinal axis results in a modification of the angle of the individual blade; and
  at least two connecting rods, wherein individual connecting rods are coupled to the slant disk at a first end of the individual connecting rods and coupled to individual blades near the proximal end of the individual blades, wherein movement of the slant disk along the column drives the longitudinal rotation of the individual blades along the blade-specific longitudinal axis;

the base assembly that includes an electrical motor configured to drive blending rotation of the blade assembly;

a container assembly that is configured to hold the foodstuffs within a container body during blending by the blender;

a control interface configured to receive user input from a user; and a control circuitry that is included in the base assembly and configured to:
  control the electrical motor in accordance with the different blending modes of operation such that, in the first blending mode, the electrical motor is controlled to accomplish the blending rotation of the blade assembly;

control the movement of the slant disk along the column of the blade assembly in accordance with the different blending modes of operations such that, in the first blending mode, the slant disk is positioned at a first position along the column, wherein, responsive to the slant disk being in the first position along the column, the individual connecting rods effectuate the longitudinal rotation of the individual blades such that the individual blades are positioned at a first angle, wherein the first angle and the first position along the column are associated with the first blending mode;

responsive to a first detection of a first type of detections regarding the user input received by the control interface:
  (i) effectuate a particular movement of the slant disk from an initial position along the column to the first position along the column, such that the individual blades are positioned at the first angle;
  (ii) effectuate a transition from the ready-to-blend mode to the first blending mode.

2. The blender of claim 1, wherein detections regarding the user input include a second type of detections, wherein the second type of detections indicates occurrences of the control interface receiving a second type of user input, wherein the second type of user input is different from a first type of user input.

3. The blender of claim 2, wherein the control circuitry is further configured to:

control the movement of the slant disk along the column of the blade assembly in accordance with different blending modes of operations such that, in a second blending mode, the slant disk is positioned at a second position along the column, wherein, responsive to the slant disk being in the second position along the column, the individual connecting rods effectuate the longitudinal rotation of the individual blades such that the individual blades are positioned at a second angle, wherein the second angle and the second position along the column are associated with the second blending mode.

4. Then blender of claim 3, wherein control circuitry is further configured to, responsive to a second detection of the second type of detections:
  (i) effectuate a second particular movement of the slant disk from the first position to the second position along the column, such that the individual blades are positioned at the second angle;
  (ii) effectuate a transition from the first blending mode to the second blending mode.

5. The blender of claim 1, wherein the angle of the individual blades varies as a function of the position of the slant disk on the column.

6. The blender of claim 1, wherein the control interface is further configured to:

effectuate presentation of a settings menu to the user, wherein the settings menu includes one or more settings capable of being selected by the user, wherein the settings include a first setting and a second setting.

7. The blender of claim 6, wherein the user selection of the first setting from the settings menu includes associating the first blending mode with a third angle for the blades.

8. The blender of claim 7, wherein the user selection of the second setting from the settings menu includes associating the second blending mode with a fourth angle for the blades.

9. The blender of claim 1, wherein the blender is a portable blender, wherein the base assembly further includes:
  a rechargeable battery configured to power the electrical motor; and
  a standardized charging interface configured to conduct electrical power to the rechargeable battery.

10. The blender of claim 1, wherein the user input includes at least one of:
  (i) tapping a touchscreen included in the control interface once,
  (ii) multiple consecutive occurrences of tapping the touchscreen, and
  (iii) swiping the touchscreen.

* * * * *